US012775277B2

(12) United States Patent
Rezvani et al.

(10) Patent No.: US 12,775,277 B2
(45) Date of Patent: Oct. 27, 2026

(54) EFFICIENT STORAGE AND ARCHITECTURE FOR STRATEGIC CONFLICT DETECTION IN UAV OPERATION MANAGEMENT

(71) Applicant: Wing Aviation LLC, Palo Alto, CA (US)

(72) Inventors: Tara Rezvani, Los Gatos, CA (US); Leslie Williams, Palo Alto, CA (US); Reinaldo Negron, San Francisco, CA (US); Kristen Cregin, Palo Alto, CA (US); Patrick Kao, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 94 days.

(21) Appl. No.: 18/747,213

(22) Filed: Jun. 18, 2024

(65) Prior Publication Data

US 2025/0370453 A1 Dec. 4, 2025

Related U.S. Application Data

(60) Provisional application No. 63/652,568, filed on May 28, 2024.

(51) Int. Cl.
*G05D 1/227* (2024.01)
*G05D 1/226* (2024.01)

(52) U.S. Cl.
CPC ............. *G05D 1/227* (2024.01); *G05D 1/226* (2024.01)

(58) Field of Classification Search
CPC ............................... G05D 1/227; G05D 1/226
(Continued)

(56) References Cited

U.S. PATENT DOCUMENTS

2016/0254878 A1* 9/2016 Wang .................... H04L 5/0053 370/329
2021/0241634 A1 8/2021 Sarim et al.
(Continued)

FOREIGN PATENT DOCUMENTS

WO 2023/192131 A9 10/2023

OTHER PUBLICATIONS

Ellis, K., et al., "In-time System-wide Safety Assurance (ISSA) Concept of Operations and Design Considerations for Urban Air Mobility (UAM)", NASA Aeronautics Research Institute, Jun. 2020, 70 pages.
(Continued)

*Primary Examiner* — Mahmoud S Ismail
(74) *Attorney, Agent, or Firm* — Christensen O'Connor Johnson Kindness PLLC

(57) ABSTRACT

In some embodiments, a system for efficient coordination of unmanned aerial vehicle (UAV) operations by a first UAV service supplier (USS) in a geographic area within which the first USS and one or more third-party USSes operate UAVs is provided. The system comprises an interoperability computing system configured to perform actions comprising: receiving, by the interoperability computing system, a new operational intent from a rule engine of the first USS; retrieving, by the interoperability computing system, a set of relevant operational intents that are relevant to the new operational intent from a geographic information data store of the first USS; comparing, by the interoperability computing system, the new operational intent to each relevant operational intent of the set of relevant operational intents to detect conflicts; and in response to detecting no conflicts, transmitting, by the interoperability computing system, an approval request to a discovery and synchronization service (DSS).

19 Claims, 10 Drawing Sheets

(58) Field of Classification Search
USPC .............................................................. 701/2
See application file for complete search history.

(56) References Cited

U.S. PATENT DOCUMENTS

| | | | | |
|---|---|---|---|---|
| 2022/0415187 | A1* | 12/2022 | Borgyos | G08G 5/59 |
| 2023/0014494 | A1* | 1/2023 | Lei | H04W 12/71 |
| 2023/0098173 | A1* | 3/2023 | Ali | G08G 5/56<br>701/120 |
| 2023/0209305 | A1* | 6/2023 | Shen | H04W 4/021<br>455/456.1 |
| 2023/0284030 | A1* | 9/2023 | Baskaran | G08G 5/53<br>455/411 |
| 2024/0098494 | A1* | 3/2024 | Baskaran | G08G 5/22 |
| 2024/0322898 | A1* | 9/2024 | Karampatsis | H04B 7/18504 |
| 2024/0349026 | A1* | 10/2024 | Nayak | H04W 12/08 |
| 2025/0201133 | A1* | 6/2025 | Taimoor | G08G 5/34 |

OTHER PUBLICATIONS

Clothier, R., et al., "Structuring the safety case for unmanned aircraft system operations in non-segregated airspace", Safety Science, Nov. 2015, 26 pages.

ASTM International, F3548-21, "Standard Specification for UAS Traffic Management (UTM) UAS Service Supplier (USS) Interoperability", Mar. 2022, 49 pages.

ASTM International, F3548-21, "Uncrewed Traffic Management (UTM) UAS Service Supplier (USS) Interoperability", Apr. 22, 2022, 6 pages.

Dowek, G., et al., "Conflict Detection and Resolution for 1,2, . . . ,N Aircraft", 7th AIAA Aviation Technology, Integration and Operations Conference, Sep. 18-20, 2007, Belfast, Northern Ireland, 13 pages.

Glossner, J., et al., "An Overview of the Drone Open-Source Ecosystem", Oct. 2021, 13 pages.

Unmanned Airspace, "UAS service providers demonstrate safe and scalable drone operations—MAAP use cases", Nov. 18, 2020, 6 pages.

Watkins et al., "The Roles of Autonomy and Assurance in the Future of Uncrewed Aircraft Systems in Low-Altitude Airspace Operations", IEEE Computer Society, IEEE USA, vol. 56, No. 7, Jul. 1, 2023, pp. 41-53, XP011943087, ISSN: 0018-9162, DOI: 10.1109/MC.2023.3242579.

Kopardekar et al., "Unmanned Aircraft System Traffic Management (UTM) Concept of Operations", 16th AIAA Aviation Technology, Integration, and Operations Conference, Jun. 10, 2016, XP093294031, ISBN: 978-1-62410-440-4, 16 pages.

PCT International Search Report and Written Opinion mailed Jul. 23, 2025, in corresponding International application No. PCT/US2025/025575, 18 pages.

* cited by examiner

EFFICIENT STORAGE AND ARCHITECTURE FOR STRATEGIC CONFLICT DETECTION IN UAV OPERATION MANAGEMENT

CROSS REFERENCE(S) TO RELATED APPLICATION(S)

This application claims the benefit of Provisional Application No. 63/652,568, filed May 28, 2024, the entire disclosure of which is hereby incorporated by reference herein for all purposes.

TECHNICAL FIELD

This disclosure relates generally to unmanned aerial vehicles (UAVs), and in particular but not exclusively, relates to managing operation of a fleet of UAVs.

BACKGROUND

Unmanned aerial systems (UASes) are being deployed for an increasing number of applications, including but not limited to gathering imagery, package delivery, and a variety of other applications. Some applications, including but not limited to package delivery, are typically implemented using fleets of UAVs in order to increase capacity of the service. As the popularity of services supplied by fleets of UAVs grows, it is increasingly likely that more than one provider of UAV services will desire to operate in a given geographic area. While there are categories of airspace that are open to UAV operations, once multiple providers of UAV services are conducting beyond visual line of sight (BVLOS) operations within a given geographic area, a need arises to deconflict traffic between the multiple UASes.

BRIEF SUMMARY

In some embodiments, a non-transitory computer-readable medium having logic stored thereon is provided. The logic, in response to execution by one or more processors of a computing system, causes the computing system to efficiently coordinate unmanned aerial vehicle (UAV) operations by a first UAV service supplier (USS) in a geographic area within which the first USS and one or more third-party USSes operate UAVs by performing actions comprising: receiving, by an interoperability computing system, a new operational intent from a rule engine of the first USS; retrieving, by the interoperability computing system, a set of relevant operational intents that are relevant to the new operational intent from a geographic information data store; comparing, by the interoperability computing system, the new operational intent to each relevant operational intent of the set of relevant operational intents to detect conflicts; and in response to detecting no conflicts, transmitting, by the interoperability computing system, an approval request to a discovery and synchronization service (DSS).

In some embodiments, a system for efficient coordination of unmanned aerial vehicle (UAV) operations by a first UAV service supplier (USS) in a geographic area within which the first USS and one or more third-party USSes operate UAVs is provided. The system comprises an interoperability computing system having one or more processors and a non-transitory computer-readable medium having logic stored thereon. The logic, in response to execution by the one or more processors, causes the interoperability computing system to perform actions comprising: receiving, by the interoperability computing system, a new operational intent from a rule engine of the first USS; retrieving, by the interoperability computing system, a set of relevant operational intents that are relevant to the new operational intent from a geographic information data store of the first USS; comparing, by the interoperability computing system, the new operational intent to each relevant operational intent of the set of relevant operational intents to detect conflicts; and in response to detecting no conflicts, transmitting, by the interoperability computing system, an approval request to a discovery and synchronization service (DSS).

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

DETAILED DESCRIPTION

Figure 1:
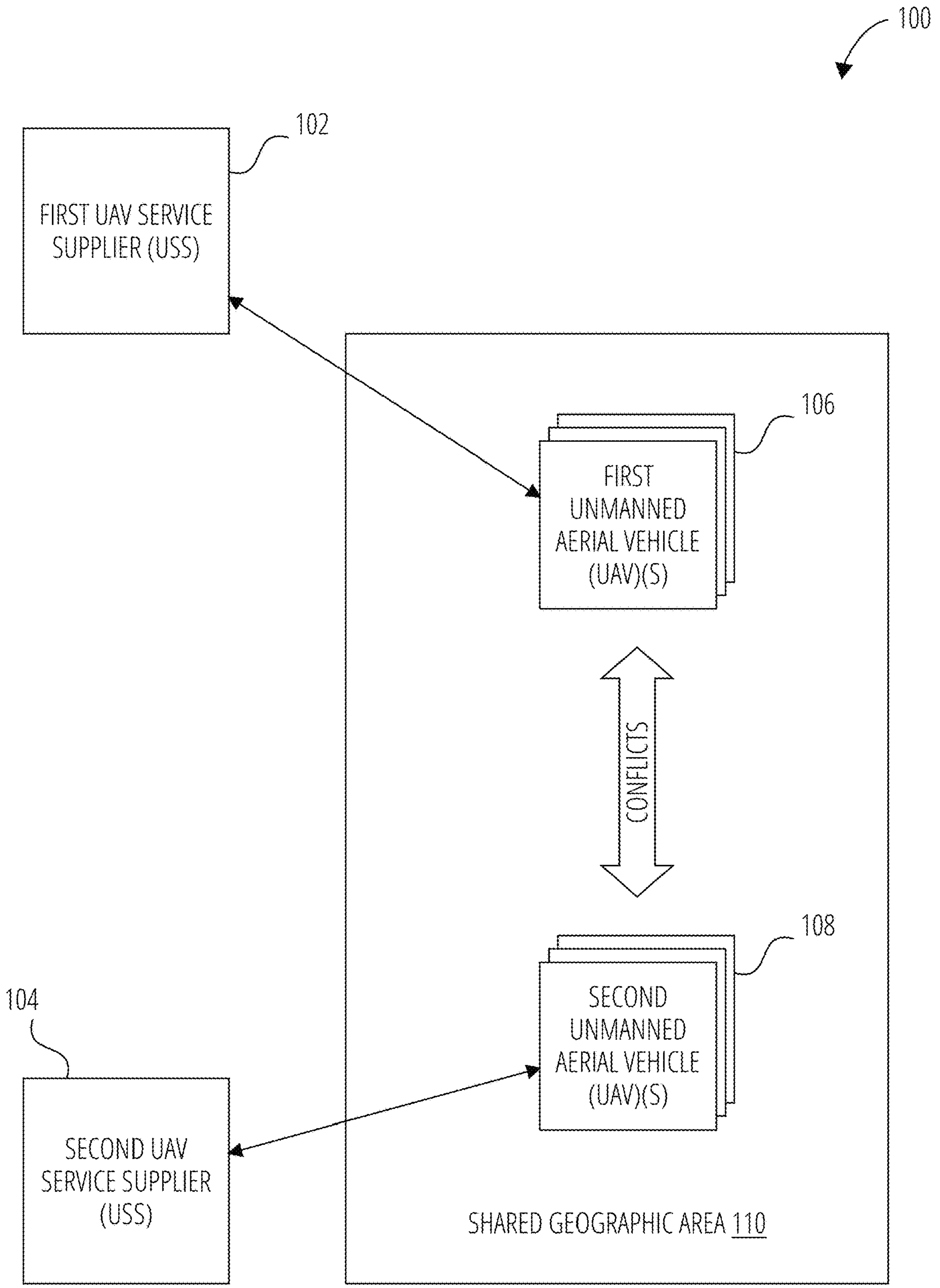
FIG. 1 is a schematic diagram that illustrates a problem when multiple providers of UAV services are operating in the same geographic area.

FIG. 1 is a schematic diagram that illustrates a problem when multiple providers of UAV services are operating in the same geographic area. As shown, the system 100 includes a first UAV service supplier (USS) 102 and a second UAV service supplier (USS) 104. The first USS 102 operates one or more first UAVs 106, and the second USS 104 operates one or more second UAVs 108. Both the first UAVs 106 and the second UAVs 108 operate within a shared geographic area 110, which may be a neighborhood, a city, a county, a state, a country, or any other predetermined geographical area. The first UAVs 106 and the second UAVs 108 may be operated in a BVLOS fashion and/or autonomously. The first USS 102 plans operation of the first UAVs 106 to avoid a risk of collision amongst the first UAVs 106, such as by managing flight plans for the first UAVs 106 to avoid overlaps, and the second USS 104 operates likewise for the second UAVs 108. While this is effective for the separate fleets when they are operating in an exclusive geographic area, once the first UAVs 106 and second UAVs 108 are both operated within the shared geographic area 110, the risk for conflicts (e.g., collisions, near misses, near midair collisions, and/or other losses of separation) between the first UAVs 106 and the second UAVs 108 must now be addressed.

Figure 2:
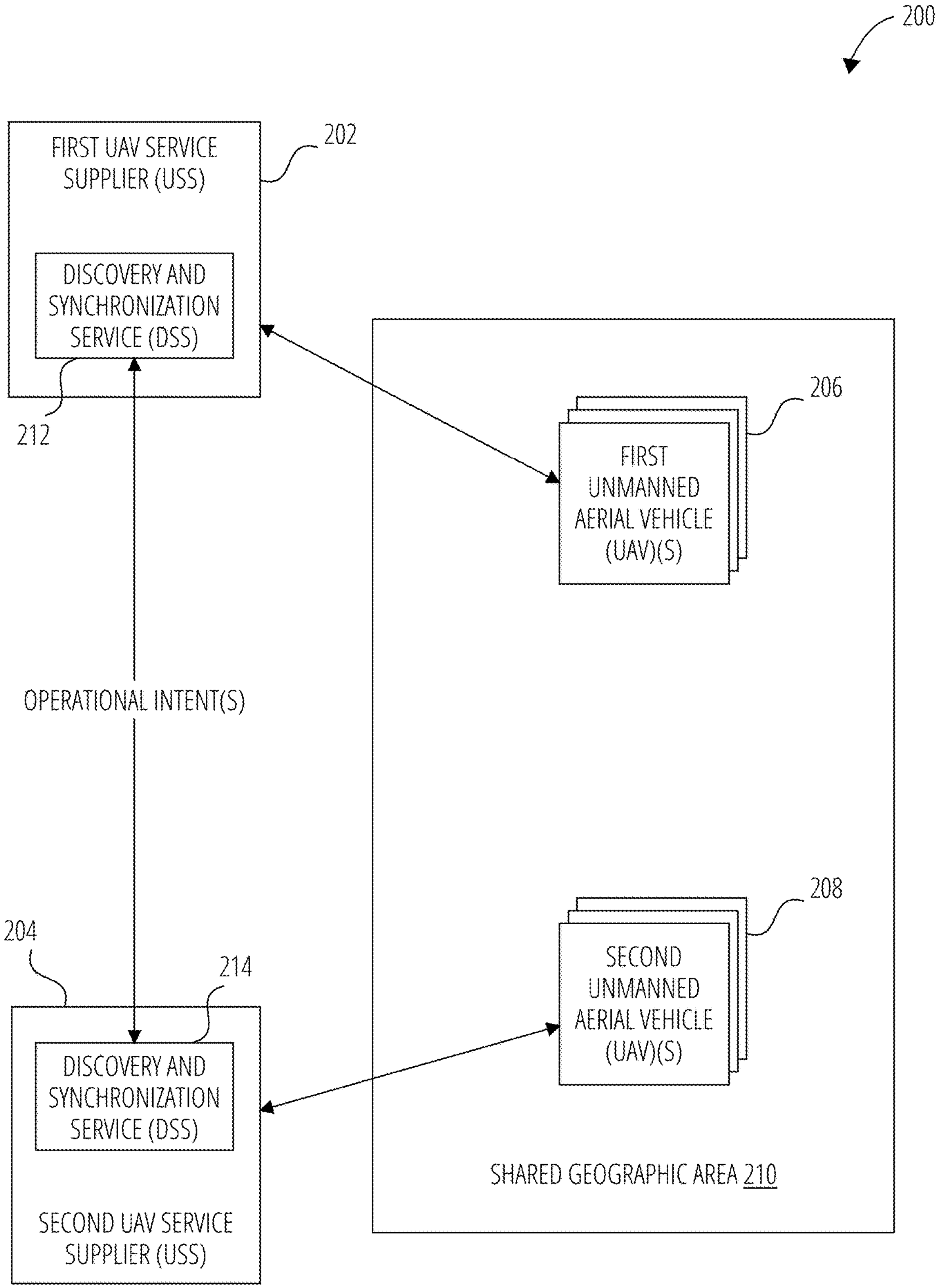
FIG. 2 is a schematic diagram that illustrates a system that has been developed to mitigate the risk of conflicts between UAVs operated by separate UAV service suppliers within a shared geographic area.

FIG. 2 is a schematic diagram that illustrates a system that has been developed to mitigate the risk of conflicts between UAVs operated by separate UAV service suppliers within a shared geographic area. In the system 200, a first USS 202 is augmented with a discovery and synchronization service (DSS) 212, and a second USS 204 is also augmented with a discovery and synchronization service (DSS) 214. The DSS 212 and DSS 214 are implementations of the "Standard Specification for UAS Traffic Management (UTM) UAS Service Supplier (USS) Interoperability," most recently published by ASTM International in March 2022, and designated F3548 (hereinafter "the Standard", and incorporated by reference herein in its entirety for all purposes). The Standard has been promulgated to allow multiple UAV service suppliers to mitigate the risk of concurrently operating UAVs within a shared geographic area 210. The DSS 212 and the DSS 214 are used to exchange operational intents (e.g., flight plans that include time-based geographical information regarding where and when UAVs are expected to be located). The DSS 212 and DSS 214 are configured to synchronize operational intents with each other, and to ensure that all desired deconfliction tasks have been performed before a new operational intent is approved. By implementing the Standard via the DSS 212 and DSS 214, the risk of conflicts between the first UAVs 206 operated by the first USS 202 and the second UAVs 208 operated by the second USS 204 within the shared geographic area 210 can be minimized. Though FIG. 2 illustrates two USSes for the sake of simplicity, one will recognize that in some embodiments, more than two USSes may be authorized to operate UAVs within the shared geographic area 210, thus further increasing the importance of minimizing the risk of conflicts during operational intent planning.

While the Standard describes techniques for enabling coordination between multiple USSes operating with the shared geographic area 210, effective implementations of the Standard face technical difficulties. As the number USSes operating within the shared geographic area 210 increases and the number of concurrent flights managed by each USS increases, previously created naïve implementations of the regulation become impractical. What is desired are technical solutions that increase the efficiency of management and exchange of operational intents in order to deconflict operations within the shared geographic area 210.

Figure 3:
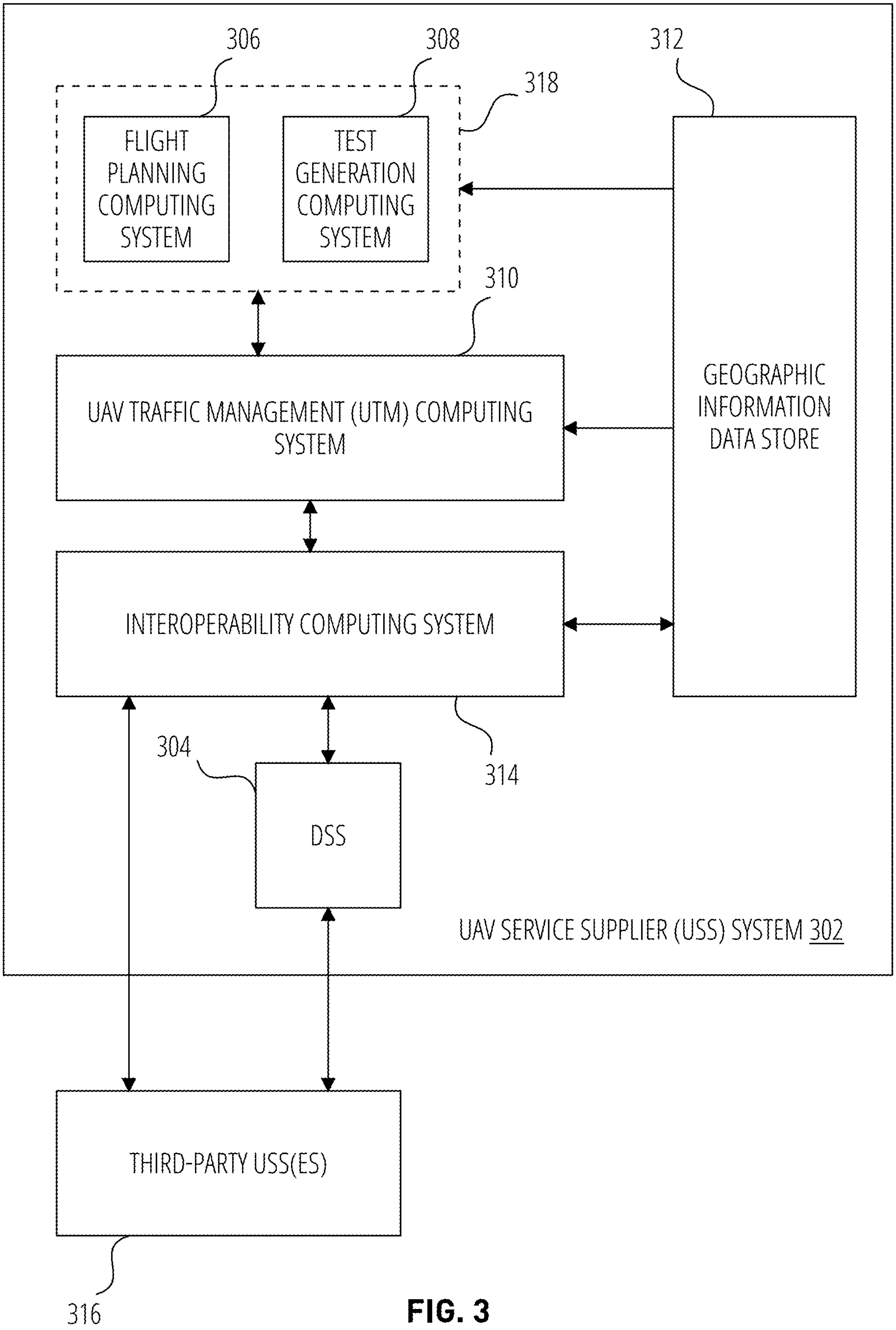
FIG. 3 is a block diagram that illustrates a non-limiting example embodiment of a UAV service supplier (USS) system according to various aspects of the present disclosure.

FIG. 3 is a block diagram that illustrates a non-limiting example embodiment of a UAV service supplier (USS) system according to various aspects of the present disclosure. The USS system 302 comprises a plurality of computing systems, including a UAV traffic management (UTM) computing system 310, an interoperability computing system 314, a geographic information data store 312, and a DSS 304.

In some embodiments, the UTM computing system 310 is configured to perform various tasks for the internal management of a fleet of UAVs. For example, the UTM computing system 310 may be configured to receive operational intents (e.g., flight plans, four-dimensional volumes for a flight along with metadata describing the flight, etc.), and to assign resources from the fleet of UAVs to service the operational intents. The UTM computing system 310 may also be configured to execute one or more rules to determine whether a given operational intent is permissible for a variety of reasons. The UTM computing system 310 may be further configured to transmit commands to various devices to cause UAVs of the fleet of UAVs to execute operational intents that are found to be permissible, either via autonomous implementation or by presentation to an operator for implementation.

Prior to being deployed in the system 200 in which multiple USSes operate UAVs within the shared geographic area 210, the UTM computing system 310 may perform various actions to ensure safe operation of the fleet of UAVs controlled by the USS system 302, such as deconfliction and ensuring compliance with airspace use requirements. In some embodiments, the interoperability computing system 314 provides functionality that enhances the functionality provided by the UTM computing system 310 to ensure deconflicted operation within the shared geographic area 210, even when other USSes are operating UAVs within the shared geographic area 210. The interoperability computing system 314 may be configured to communicate with the DSS 304 and with one or more third-party USSes 316 to ensure that operational intents from the UTM computing system 310 do not conflict with operational intents from other third-party USSes 316.

In some embodiments, the geographic information data store 312 is configured to store information such as operational intents in a way that is indexed according to geographic relevance and that therefore allows efficient storage and retrieval of operational intents based on geography. For example, a geographic index value may be stored with each operational intent in the geographic information data store 312, such that the geographic index values allow all operational intents relevant to a given geographic location (e.g., potentially overlapping operational intents) to be retrieved. By providing the geographic information data store 312 as a separate component from the UTM computing system 310 and the interoperability computing system 314, technical benefits can be achieved by allowing highly efficient communication between the components, and by reducing the need for duplicating infrastructure for efficient storage of operational intents.

In some embodiments, the geographic information data store 312 is also configured to store information at various levels of detail to support different efficiency goals for different tasks and different consumers of the information. For example, the geographic information data store 312 may store a simplified version of given geographic information for an operational intent so that this simplified version may be indexed in order to quickly service storage requests (while more detailed information is stored in accompanying metadata), and may in time store a detailed version of the given geographic information in order to provide support for more detailed, less time-sensitive analysis. For example, a simplified version of geographic information for an operational intent may be stored for UTM service efficiency, and may be accompanied by detailed metadata that may be extracted by and provided to an operator in order to assist them in fulfilling the operational intent.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

In some embodiments, the DSS 304 is configured to manage communication between the USS system 302 and the third-party USSes 316 as outlined in the Standard. In FIG. 3, the DSS 304 is illustrated as being part of the USS system 302. Typically, each USS system 302 may implement their own separate DSS 304, as illustrated. In some embodiments, a USS system 302 may access a DSS 304 provided by a third party, instead of having a DSS 304 operating within the USS system 302.

The USS system 302 also includes one or more operational intent creators 318. In some embodiments, an operational intent creator 318 is any type of computing system or other entity that generates operational intents, and may be referred to as an operator. In FIG. 3, a flight planning computing system 306 and a test generation computing system 308 are illustrated as non-limiting example embodiments of operational intent creators 318. The flight planning computing system 306 may be a computing system which is used to plan flights for the UAVs operated by the USS system 302. The flight planning computing system 306 may plan flights in an automated manner in response to goals provided to the flight planning computing system 306 (e.g., package pickup and delivery locations; desired locations from which to collect data, etc.), and/or may be used by operators to plan flights at least partially in a manual manner. The test generation computing system 308 may be configured to generate and submit test flights to the UTM computing system 310 that are either expected to be accepted by the conflict avoidance logic or to be rejected by the conflict avoidance logic in order to ensure that the conflict avoidance logic is working as expected by the Standard.

The illustrated implementation of the USS system 302 divides operations of the USS system 302 that would normally be implemented in a monolithic fashion (or not provided at all) into multiple computing systems that work together to manage operational intents and coordinate with other USSes. The division of labor amongst these separate computing systems provides technical benefits in both performance and flexibility: As will be discussed in further detail below, splitting communication with the third-party USSes 316 and the DSS 304 into the interoperability computing system 314 instead of keeping it within the UTM computing system 310 allows the deconfliction communication to easily be integrated with other internal deconfliction practices performed by the UTM computing system 310 for the UAVs operated by the USS system 302 itself. Further, sharing the geographic information data store 312 between both the UTM computing system 310 and the interoperability computing system 314 (and, in some embodiments, the operational intent creator 318) allows these systems to both take advantage of the efficient storage of geographic information provided thereby.

Further details of the configuration of each of these systems is provided below.

Figure 4:
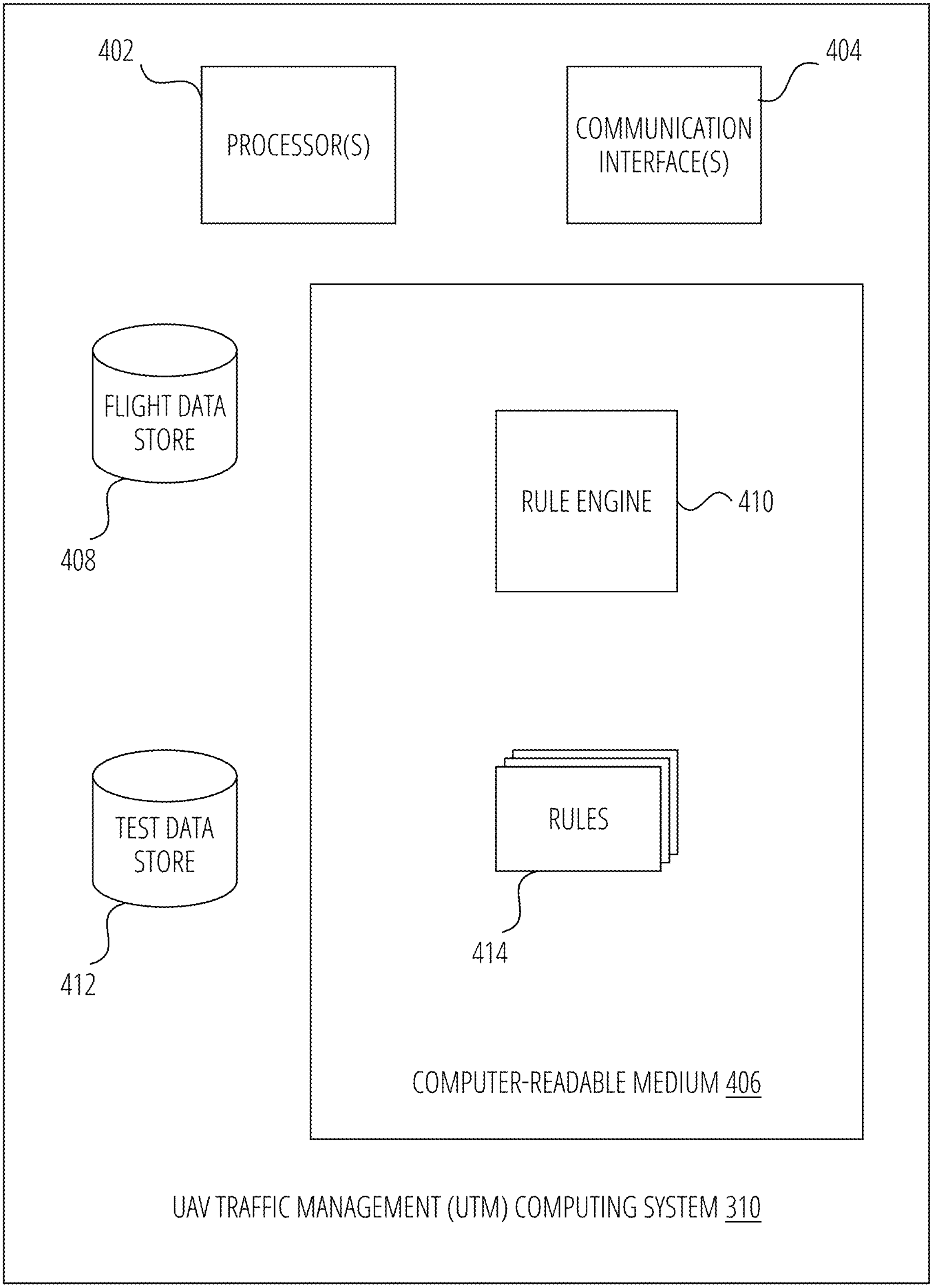
FIG. 4 is a block diagram that illustrates aspects of a non-limiting example embodiment of a UAV traffic management (UTM) computing system according to various aspects of the present disclosure.

FIG. 4 is a block diagram that illustrates aspects of a non-limiting example embodiment of a UAV traffic management (UTM) computing system according to various aspects of the present disclosure. The illustrated UTM computing system 310 may be implemented by any computing device or collection of computing devices, including but not limited to a desktop computing device, a laptop computing device, a mobile computing device, a server computing device, a computing device of a cloud computing system, and/or combinations thereof.

As shown, the UTM computing system 310 includes one or more processors 402, one or more communication interfaces 404, a flight data store 408, a test data store 412, and a computer-readable medium 406.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other optical disk storage; a magnetic cassette; a magnetic tape; and a magnetic disk storage.

In some embodiments, the processors 402 may include any suitable type of general-purpose computer processor. In some embodiments, the processors 402 may include one or more special-purpose computer processors or AI accelerators optimized for specific computing tasks, including but not limited to graphical processing units (GPUs), vision processing units (VPUs), and tensor processing units (TPUs).

In some embodiments, the communication interfaces 404 include one or more hardware and or software interfaces suitable for providing communication links between components. The communication interfaces 404 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 406 has stored thereon logic that, in response to execution by the one or more processors 402, causes the UTM computing system 310 to provide a rule engine 410.

As used herein, "engine" refers to logic embodied in hardware or software instructions, which can be written in one or more programming languages, including but not limited to C, C++, C#, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can also be implemented by logic programmed into an application-specific integrated circuit (ASIC), a field-programmable gate array (FPGA), or another hardware device.

In some embodiments, the rule engine 410 is configured to execute a plurality of rules 414 to determine whether an operational intent representing a proposed flight (stored in the flight data store 408) or an operational intent representing test input (stored in the test data store 412) should be allowed. The plurality of rules 414 may include rules that check a variety of characteristics of an operational intent. For example, a first rule may check whether a pilot assigned to the operational intent has a license required by the other characteristics of the operational intent, a second rule may check whether the airspace transited by the operational intent allows the desired use, and so on. The plurality of rules 414 includes a strategic conflict detection (SCD) rule, which uses functionality of the interoperability computing system 314 to determine whether a proposed operational intent conflicts with any other operational intents from the third-party USSes 316. By utilizing a SCD rule within the plurality of rules 414, contextual configuration functionality provided by the rule engine 410 may be used to selectively apply the logic of the SCD rule for operational intents within geographic areas in which other third-party USSes 316 are operating, and to refrain from applying the logic of the SCD rule for operational intents within other geographic areas in which the USS system 302 is the only USS system operating.

Further description of the configuration of each of these components is provided below.

Figure 5:
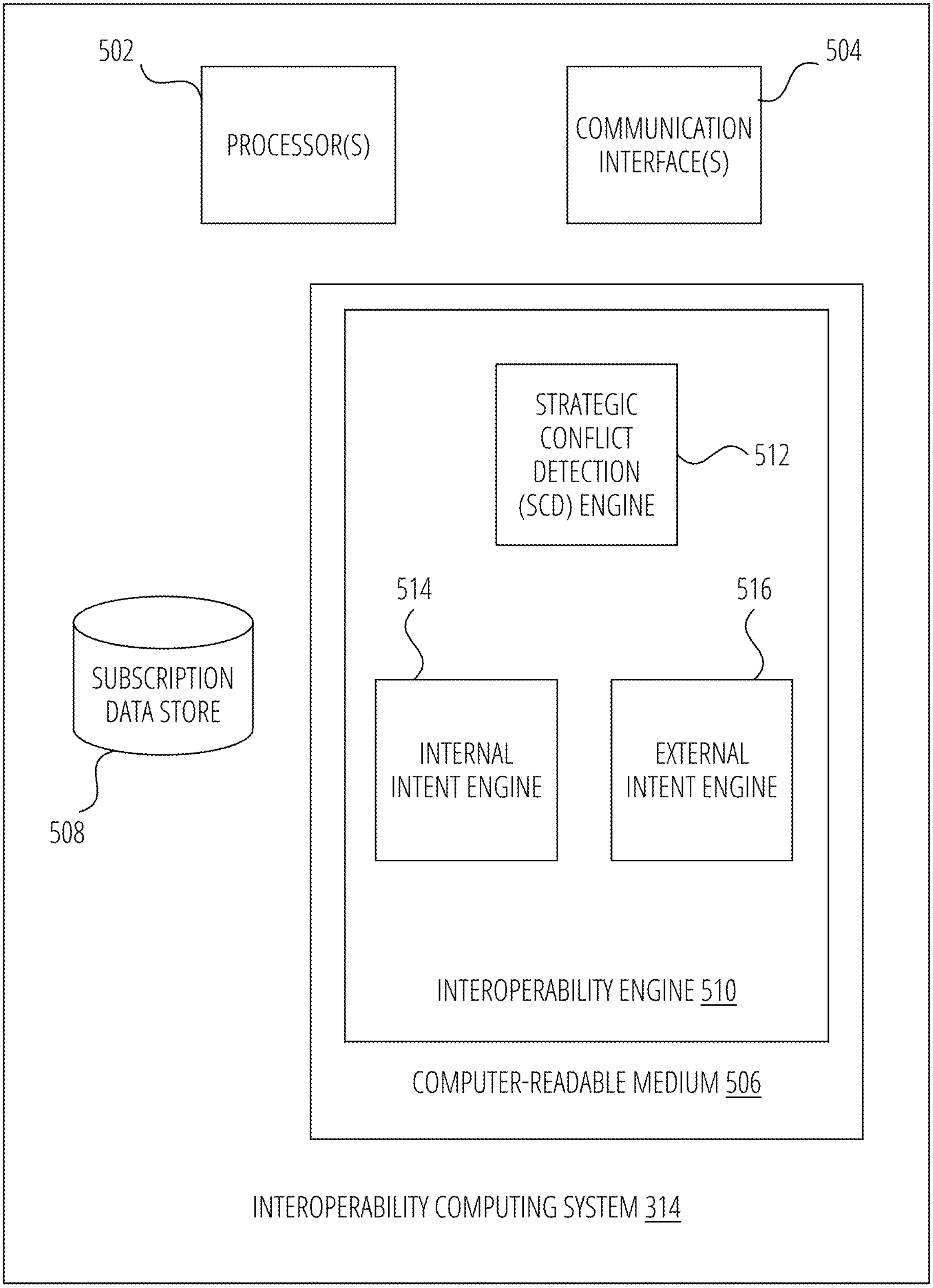
FIG. 5 is a block diagram that illustrates aspects of a non-limiting example embodiment of an interoperability computing system according to various aspects of the present disclosure.

FIG. 5 is a block diagram that illustrates aspects of a non-limiting example embodiment of an interoperability computing system according to various aspects of the present disclosure. The illustrated interoperability computing system 314 may be implemented by any computing device or collection of computing devices, including but not limited to a desktop computing device, a laptop computing device, a mobile computing device, a server computing device, one or more computing devices of a cloud computing system, and/or combinations thereof.

As shown, the interoperability computing system 314 includes one or more processors 502, one or more communication interfaces 504, a subscription data store 508, and a computer-readable medium 506.

In some embodiments, the processors 502 may include any suitable type of general-purpose computer processor. In some embodiments, the processors 502 may include one or more special-purpose computer processors or AI accelerators optimized for specific computing tasks, including but not limited to graphical processing units (GPUs), vision processing units (VPUs), and tensor processing units (TPUs).

In some embodiments, the communication interfaces 504 include one or more hardware and or software interfaces suitable for providing communication links between components. The communication interfaces 504 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 506 has stored thereon logic that, in response to execution by the one or more processors 502, cause the interoperability computing system 314 to provide an interoperability engine 510 that includes a strategic conflict detection (SCD) engine 512, an internal intent engine 514, and an external intent engine 516.

In some embodiments, the SCD engine 512 is configured to provide logic for supporting strategic conflict detection. For example, the SCD engine 512 may manage subscriptions between the USS system 302 and one or more third-party USSes 316 for the sharing of operational intents for some or all of the shared geographic area 210. Upon obtaining a request for a subscription for a given portion of the shared geographic area 210, the SCD engine 512 may upsert a record of the subscription in the subscription data store 508. Such subscriptions may be time-limited, in that once an expiration time is reached, the subscription is automatically disabled and/or removed from the subscription data store 508. As another example, the SCD engine 512 may check for conflicts between a new operational intent provided by the SCD rule and existing operational intents stored in the geographic information data store 312. As yet another example, the SCD engine 512 may communicate with the DSS 304 to ensure that a new operational intent does not conflict with any existing operational intents from third-party USSes 316.

In some embodiments, the internal intent engine 514 may be configured to receive operational intents from other components of the USS system 302 (e.g., the SCD engine 512, the SCD rule, and/or the external intent engine 516, and to store the operational intents in the geographic information data store 312.

In some embodiments, the external intent engine 516 may be configured to communicate with one or more third-party USSes 316 per the subscriptions stored in the subscription data store 508 to retrieve existing operational intents from the third-party USSes 316 and to provide them to the internal intent engine 514 for storage. In some embodiments, the external intent engine 516 may also be configured to transmit operational intents generated by the USS system 302 to the one or more third-party USSes 316 that have subscribed to receive them.

In some embodiments, when the external intent engine 516 retrieves an existing operational intent from a third-party USS 316, the existing operational intent may include detailed geographic information. The detailed geographic information may include a detailed four-dimensional path intended to be taken by a UAV controlled by the third-party USS 316. For example, the detailed geographic information may include a series of waypoints that each include a latitude and a longitude (or another indicator of a geographic location), an altitude, and a time or time period associated with the waypoint; a set of edges connecting the waypoints; and a buffer distance from the edges and/or waypoints. The existing operational intent may also include other information usable for strategic conflict detection, including but not limited to an identifier of the third-party USS 316 and an opaque version number (OVN) value.

Further description of the configuration of each of these components is provided below.

Figure 6A:
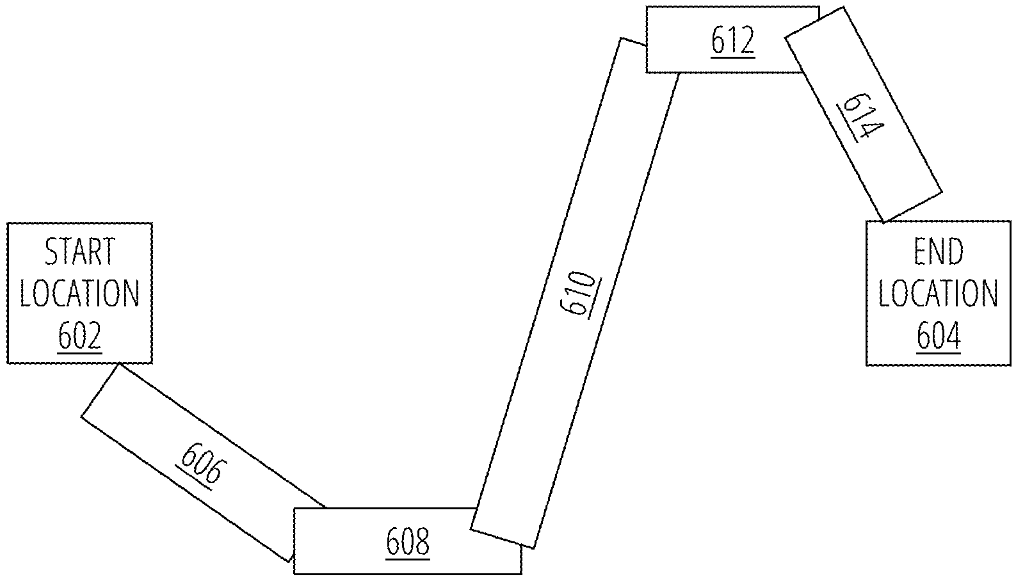
FIG. 6A and FIG. 6B illustrate a non-limiting example embodiment of detailed geographic information from an operational intent and simplified geographic information representing the detailed geographic information, according to various aspects of the present disclosure.
Figure 6B:
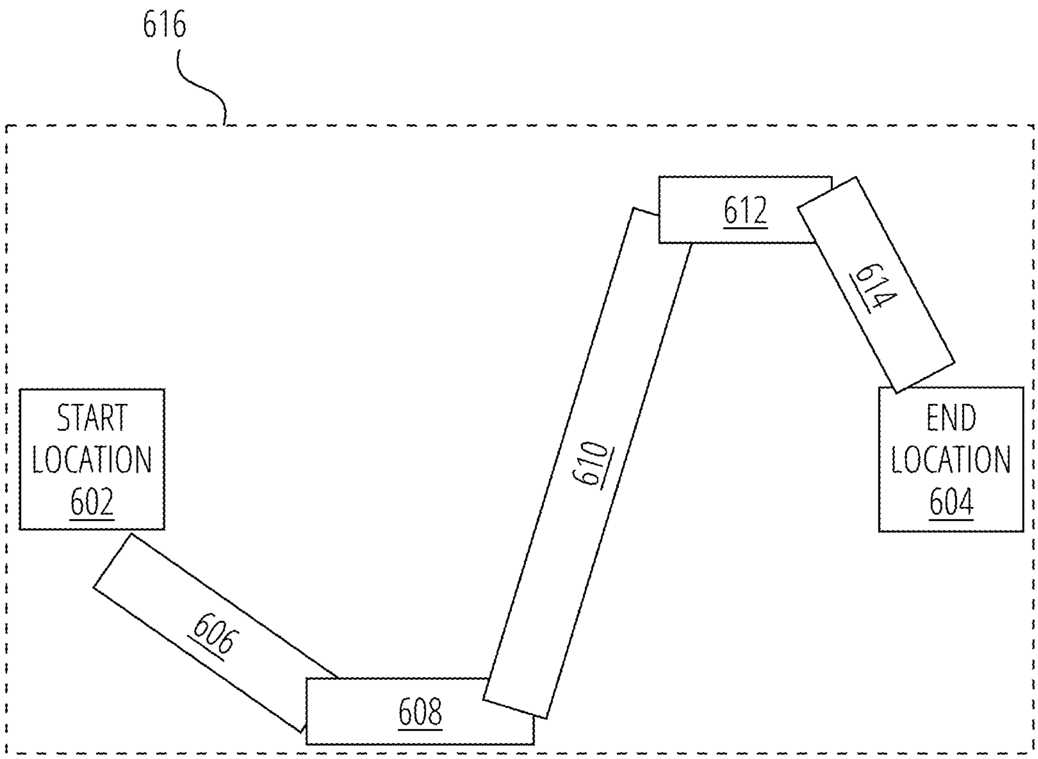
Figure 7A:
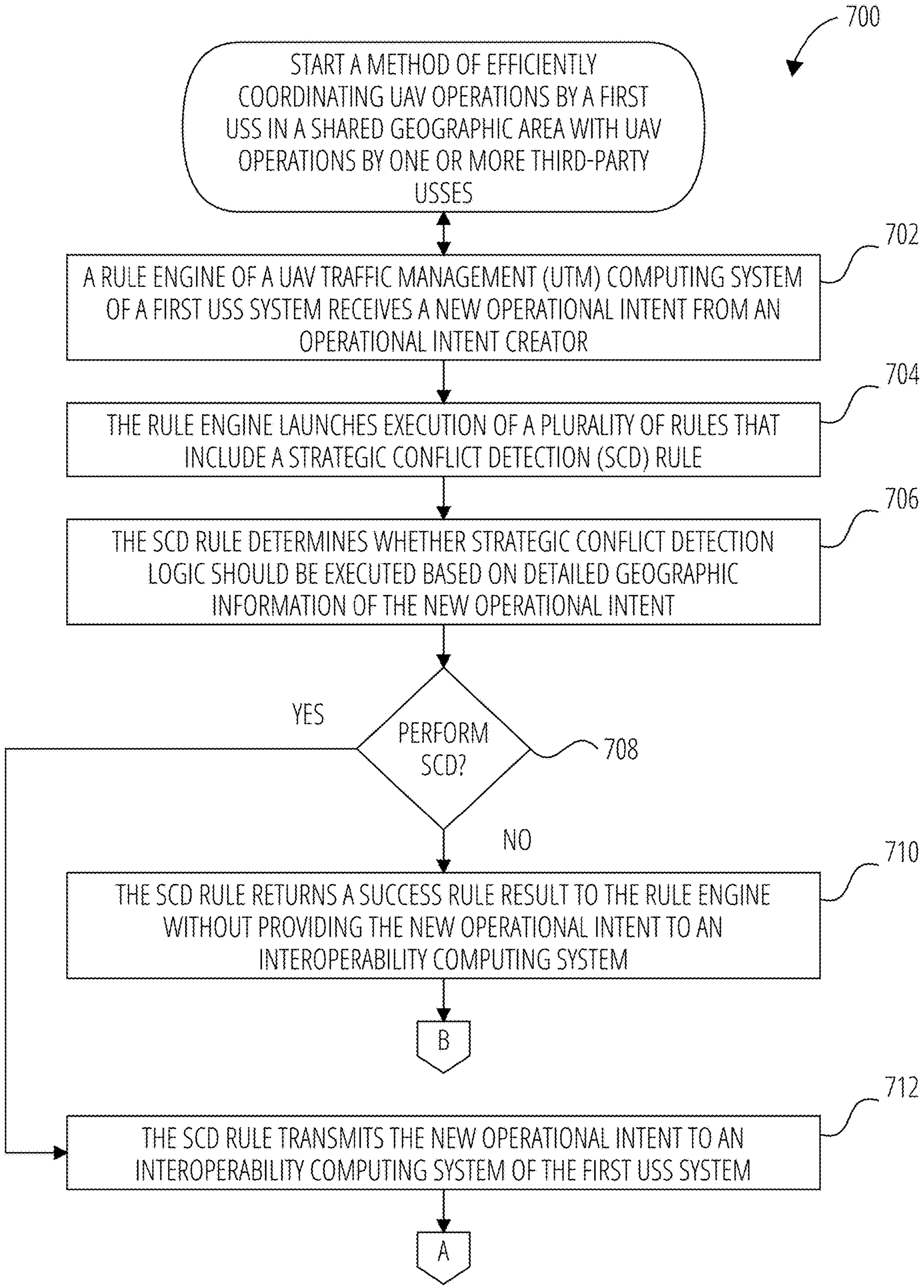
FIG. 7A-FIG. 7D are a flowchart that illustrates a non-limiting example embodiment of a method of efficiently coordinating UAV operations by a first USS in a shared geographic area with UAV operations by one or more third-party USSes, according to various aspects of the present disclosure.
Figure 7B:
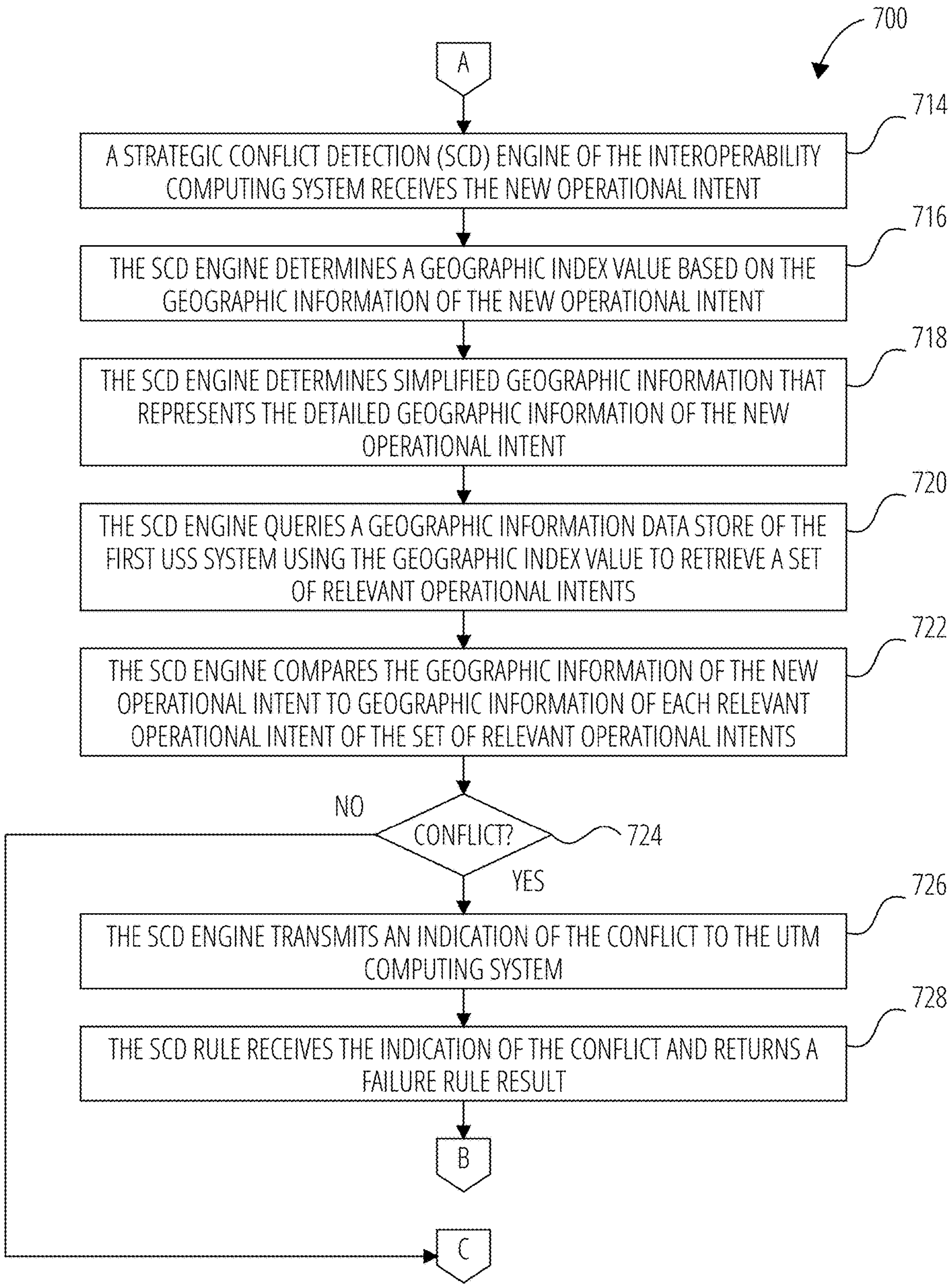
Figure 7C:
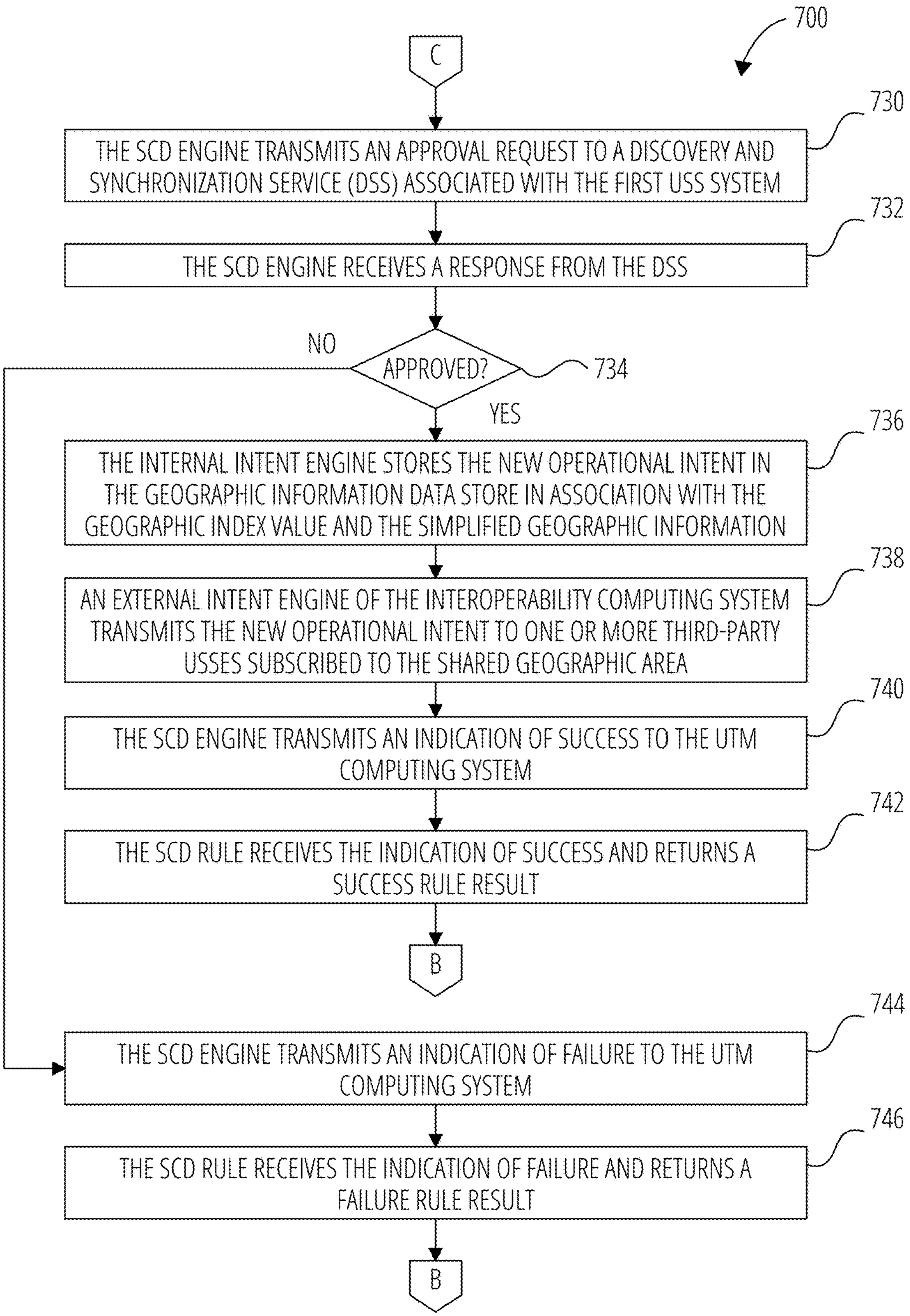
Figure 7D:
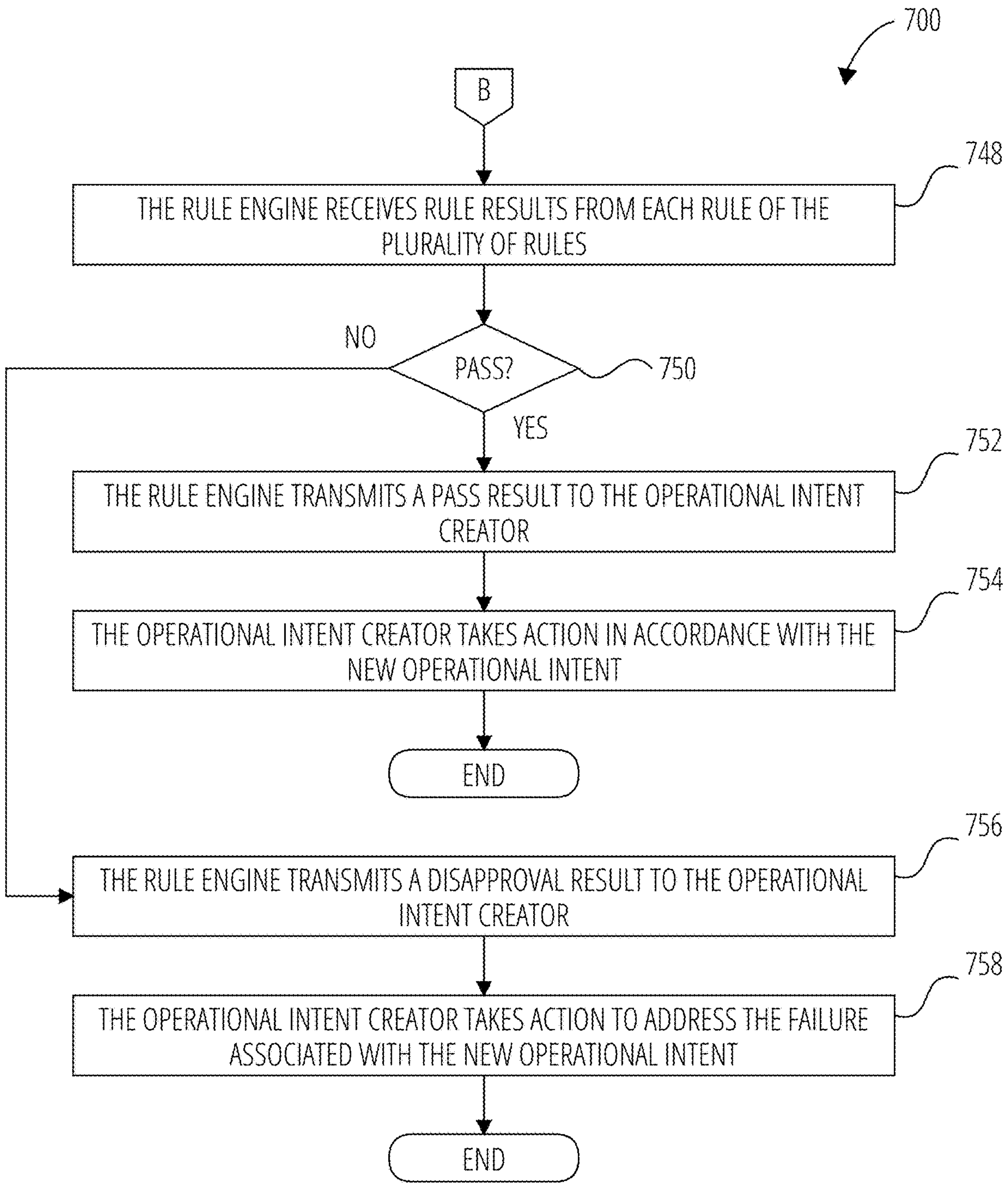

When storing the existing operational intent received by the external intent engine 516 (and/or other operational intents), the internal intent engine 514 may determine simplified geographic information associated with the existing operational intent. FIG. 6A and FIG. 6B illustrate a non-limiting example embodiment of detailed geographic information from an operational intent and simplified geographic information representing the detailed geographic information, according to various aspects of the present disclosure.

FIG. 6A illustrates a non-limiting example embodiment of detailed geographic information, and shows a start location 602, an end location 604, and a plurality of segments 606-614. Each of the segments 606-614 may include a start point and an end point that define the endpoints of an edge, and a buffer distance from the edge that defines horizontal and vertical separation from the edge that will be reserved for the UAV executing the operational intent. In some embodiments, the buffer distance may be specified by the detailed geographic information, while in other embodiments, the buffer distance may be provided by the USS system 302 upon receiving or generating the operational intent. Each segment start point and end point may indicate a time at which the UAV is expected to be present, such that each of the segments 606-614 also defines a time period in which the UAV is expected to be therein. Though illustrated as being slightly separated for the sake of clarity, one will recognize that a start point of the first segment 606 may coincide with the start location 602, and an end point of the last segment 614 may coincide with the end location 604. Further, though illustrated in two dimensions, one will recognize that each of the segments 606-614 represents a path through three-dimensional space.

One will note that the segments 606-614 do not pass directly from the start location 602 to the end location 604, but instead define a serpentine path from the start location 602 to the end location 604. This may be fairly typical, as a flight planner may need to adjust a path from the start location 602 to the end location 604 to avoid obstacles, to deconflict with other traffic, to avoid areas of restricted airspace, to visit one or more intermediate destinations (e.g., a package pickup location), or for any other reason. While the use of detailed geographic information such as this can help avoid reserving unnecessarily large portions of the shared geographic area 210 for the operational intent, searching for and checking for conflicts based the detailed geographic information may be extremely complex, and may therefore not be adequately performant once the number of operational intents sharing the shared geographic area 210 increases.

Accordingly, in embodiments of the present disclosure, the internal intent engine 514 (or other components of the USS system 302) may determine simplified geographic information based on the detailed geographic information, and the simplified geographic information may be stored along with the operational intent in the geographic information data store 312 in order to accelerate initial search and comparison operations. In FIG. 6B, the detailed geographic information specified by the start location 602, the end location 604, and the plurality of segments 606-614 is converted to simplified geographic information represented by bounding volume 616. The bounding volume 616 is defined in a horizontal plane by the furthest extents north, south, east, and west of the detailed geographic information. The bounding volume 616 may be defined in a vertical plane by the highest altitude of the detailed geographic information and the ground, and may be defined in a time dimension as extending from an earliest time to a latest time of the detailed geographic information.

By using a four-dimensional rectangular prism as the simplified geographic information, simple mathematical comparisons may be used to determine if two operational intents potentially conflict with each other. This simplified geographic information may be quickly compared, and if a potential conflict is found, the detailed geographic information may be used for a more computationally expensive, but precise, determination. Though a four-dimensional rectangular prism is illustrated here, in other embodiments, other representations may be used for the simplified geographic information. For example, in some embodiments, the smallest S2 cell that includes the entirety of the detailed geographic information may be determined and used for the simplified geographic information.

Further, the detailed geographic information that is illustrated is a trajectory-based operational intent. In some embodiments, an operational intent may include detailed geographic information in another format, such as an area-based operational intent without a specific path. An area-based operational intent may be specified as a four-dimensional cylinder or any other suitable representation of a flight volume for a given period of time. In some embodiments, such representations may also be converted into a rectangular prism (or other efficiently shaped) bounding volume, in order to facilitate the comparison of the area-based operational intents to trajectory-based operational intents.

FIG. 7A-FIG. 7D are a flowchart that illustrates a non-limiting example embodiment of a method of efficiently coordinating UAV operations by a first USS in a shared geographic area with UAV operations by one or more third-party USSes, according to various aspects of the present disclosure. In the method 700, efficiencies gained by the architecture illustrated in FIG. 3 and the innovative use of the geographic information data store 312 improve coordination with the third-party USSes 316 beyond that provided by previous implementations of the Standard.

From a start block, the method 700 proceeds to block 702, where a rule engine 410 of a UTM computing system 310 of the first USS system 302 receives a new operational intent from an operational intent creator 318. In some embodiments, the new operational intent may represent an actual flight planned by a flight planning computing system 306, a test flight injected by a test generation computing system 308, or any other type of operational intent generated by an operational intent creator 318. Actual flights and test flights are handled similarly by the method 700 so that the injection of test operational intents can provide valid test results for the operation of the method 700. The new operational intent may include detailed geographic information as discussed above, and may also include one or more of an identifier of the requester, characteristics of the tasks to be performed during the flight (e.g., one or more of package pickup, package dropoff, data to be collected, etc.), information about an assigned pilot, and/or other information regarding the new operational intent.

At block 704, the rule engine 410 launches execution of a plurality of rules 414 that include a strategic conflict detection (SCD) rule. In some embodiments, the rule engine 410 may execute the rules 414 in parallel, while in other embodiments, the rule engine 410 may execute the rules 414 sequentially or execute the rules 414 using a combination of sequential and parallel execution. The SCD rule includes the logic for strategic conflict detection, and as described above, each of the rules 414 other than the SCD rule may approve a different aspect of the new operational intent, such as proper licensure, proper use of restricted airspace, etc.

In some embodiments, the rule engine 410 may include infrastructure for providing applicability information to each of the rules 414. The applicability information may include combinations of the values included in the new operational intent, and may be used by each of the rules 414 to determine whether or not to fully execute its logic. For example, a regulation may indicate that a pilot may need to have a specific type of license to operate a first type of UAV, while a pilot may not need any type of license to operate a second type of UAV. As such, a rule 414 for checking licenses may be provided with applicability information that includes the type of UAV specified in the new operational intent, and may choose to execute logic for performing license checks only if the specified type of UAV requires a license.

Using this infrastructure, at block 706, the SCD rule determines whether strategic conflict detection logic should be executed based on the detailed geographic information of the new operational intent. In some embodiments, the SCD rule may query the SCD engine 512 of the interoperability computing system 314 to determine whether there is a subscription associated with the area covered by the detailed geographic information, or if the area covered by the detailed geographic information is otherwise within the shared geographic area 210.

The method 700 then proceeds to a decision block 708, where a determination is made based on whether the SCD rule has determined whether the strategic conflict detection logic should be executed. If the SCD rule determined that the strategic conflict detection logic should not be executed (e.g., the detailed geographic information is not associated with the shared geographic area 210 or a subset of the shared geographic area 210 for which a subscription is active), then the result of decision block 708 is NO, and the method 700 advances to block 710. At block 710, the SCD rule returns a success rule result to the rule engine 410 without providing the new operational intent to an interoperability computing system 314. The method 700 then proceeds to a continuation terminal ("terminal B"), where the method 700 continues once rule results for all of the rules 414 have been obtained.

Returning to decision block 708, if the SCD rule determined that the strategic conflict detection logic should be executed, then the result of decision block 708 is YES, and the method 700 advances to block 712. At block 712, the SCD rule transmits the new operational intent to an interoperability computing system 314 of the first USS system 302. The method 700 then proceeds to a continuation terminal ("terminal A").

From terminal A (FIG. 7B), the method 700 proceeds to block 714, where a strategic conflict detection (SCD) engine 512 of the interoperability computing system 314 receives the new operational intent. By transmitting the new operational intent to the interoperability computing system 314 instead of having the rule engine 410 of the UTM computing system 310 perform the strategic conflict detection tasks, efficiencies are obtained, at least because separate and appropriately powered computing resources can be applied to the strategic conflict detection tasks and other tasks executed by the rules 414 in parallel.

At block 716, the SCD engine 512 determines a geographic index value based on the geographic information of the new operational intent. In some embodiments, the geographic index value is the identity of an S2 cell at a given level that includes one or more of the start location 602 or the end location 604 specified by the detailed geographic information. The level of the S2 cell may be determined by the maximum range of a UAV that will be operating in the shared geographic area 210. For example, a level 7 S2 cell may be appropriate to be used as the geographic index value, as a level 7 S2 cell and its eight neighbors may contain all possible conflicting operational intents given a current maximum range of UAVs. In some embodiments, other appropriate values may be used for the geographic index value.

At block 718, the SCD engine 512 determines simplified geographic information that represents the detailed geographic information of the new operational intent. As illustrated above in FIG. 6B, the simplified geographic information may be a four-dimensional bounding volume that includes the entirety of the detailed geographic information for the entire time of the new operational intent.

At block 720, the SCD engine 512 queries a geographic information data store 312 of the first USS system 302 using the geographic index value to retrieve a set of relevant operational intents. In some embodiments, the geographic information data store 312 may determine the relevant operational intents by finding operational intents that have the same geographic index value. In some embodiments, such as embodiments wherein the geographic index value is an identifier of an S2 cell, the geographic information data store 312 may determine the relevant operational intents by finding operational intents that have either the same geographic index value or geographic index values associated with the eight neighboring S2 cells at a predetermined level.

At block 722, the SCD engine 512 compares the geographic information of the new operational intent to geographic information of each relevant operational intent of the set of relevant operational intents. In some embodiments, the SCD engine 512 may use the multiple levels of detail returned by the geographic information data store 312 to accelerate the comparison of the operational intents. For example, the SCD engine 512 may first compare the simplified geographic information of the new operational intent to the simplified geographic information of the relevant operational intents. The representation format of the simplified geographic information allows for extremely fast comparisons, and since the simplified geographic information is a superset of the detailed geographic information, failing to find a conflict between the simplified geographic information of two operational intents would guarantee that there are no conflicts between the detailed geographic information. If the SCD engine 512 finds a conflict between the new operational intent and one or more of the relevant operational intents, then the SCD engine 512 may perform a four-dimensional comparison of the detailed geographic information of the new operational intent to the detailed geographic information of the potentially conflicting relevant operational intents to confirm whether there is or is not a conflict. By using this multi-layered technique, the SCD engine 512 accelerates the determination of conflicts by simplifying the computation of at least some of the comparisons that may be trivially determined.

The method 700 then proceeds to decision block 724, where a determination is made regarding whether any of the comparisons of the geographic information resulted in a conflict. If a conflict was detected, then the result of decision block 724 is YES, and the method 700 proceeds to block 726. At block 726, the SCD engine 512 transmits an indication of the conflict to the UTM computing system 310, and at block 728, the SCD rule receives the indication of the conflict and returns a failure rule result. In some embodiments, the indication of the conflict may include an identity of one or more conflicting operational intents to allow the flight planning computing system 306 to re-plan the new operational intent to avoid the conflicts. The method 700 then advances to a continuation terminal ("terminal B").

Returning to decision block 724, if no conflict was detected, then the result of decision block 724 is NO, and the method 700 advances to a continuation terminal ("terminal C"). From terminal C (FIG. 7C), the method 700 proceeds to block 730, where the SCD engine 512 transmits an approval request to a discovery and synchronization service (DSS) 304 associated with the first USS system 302. The content of an approval request is defined in the Standard, and includes the opaque version numbers (OVNs) of all of the existing operational intents within the shared geographic area 210 against which the new operational intent was checked for conflicts. The approval request may also include an OVN that was created by the SCD engine 512 and assigned to the new operational intent. In some embodiments, the SCD engine 512 may request OVNs from all of the existing operational intents stored in the geographic information data store 312 to be included in the approval request, even if an explicit comparison between the new operational intent and a given existing operational intent was performed due to earlier portions of the method 700 determining that there is no possibility of conflict between them.

At block 732, the SCD engine 512 receives a response from the DSS 304. The DSS 304 does not store details of existing operational intents, but does store all of the OVNs of existing operational intents along with identifiers of the associated USS systems. Per the Standard, by having the USS system 302 provide the list of OVNs that were considered in planning the new operational intent, the DSS 304 can determine whether all of the existing operational intents have been deconflicted, or whether the DSS 304 has become aware of existing operational intents that are not yet known to the USS system 302 submitting the approval request, without actually having access to details of the existing operational intents or performing any conflict checks itself.

The method 700 then proceeds to decision block 734, where a determination is made regarding whether the response from the DSS 304 indicates that the new operational intent is approved. The DSS 304 will approve the new operational intent if it has determined that all of the current OVNs were checked, and will disapprove the new operational intent if the DSS 304 is aware of current OVNs that were not checked. If the response from the DSS 304 indicates that the new operational intent is disapproved, the response may also include the identifiers of the third-party USSes 316 that issued the OVNs that had not been considered so that the USS system 302 may request the unconsidered operational intents from them.

It should be noted that the techniques of method 700 provide technical improvements to the naïve workflow outlined in the Standard. In the Standard, the USS system 302 is expected to query the DSS 304 for all of the third-party USSes 316 that have existing operational intents within an area of interest, and is then expected to query the indicated third-party USSes 316 for their existing operational intents within the area. This creates a significant bottleneck for flight planning, since the USS system 302 must wait for one round trip communication with the DSS 304 and then wait for round trip communications for each of the indicated third-party USSes 316 to complete before conflicts between the new operational intent and the existing operational intents can even begin to be checked. By subscribing to receive existing operational intents from the third-party USSes 316 as they are created, storing them in the geographic information data store 312, and checking against them using the efficiency-improving techniques described above prior to sending a first approval request to the DSS 304 removes this bottleneck and allows for a faster overall flight approval process and reduced computational load on the DSS 304.

If the response from the DSS 304 indicates that the new operational intent is approved, then the result of decision block 734 is YES, and the method 700 proceeds to block 736. At block 736, the internal intent engine 514 stores the new operational intent in the geographic information data store 312 in association with the geographic index value and the simplified geographic information. The internal intent engine 514 (or another component) may also store the OVN in association with the new operational intent.

At block 738, an external intent engine 516 of the interoperability computing system 314 transmits the new operational intent to one or more third-party USSes 316 subscribed to the shared geographic area 210. The new operational intent transmitted to the one or more third-party USSes 316 includes the OVN, and also includes the detailed geographic information. In some embodiments, the simplified geographic information is not transmitted to the one or more third-party USSes 316, because it is used for internal purposes within the USS system 302 and would not be understood by the third-party USSes 316.

At block 740, the SCD engine 512 transmits an indication of success to the UTM computing system 310. At block 742, the SCD rule receives the indication of success and returns a success rule result, which indicates to the rule engine 410 that the strategic conflict detection logic was successful. The method 700 then proceeds to a continuation terminal ("terminal B"), where the rule engine 410 waits for results from the rest of the rules 414 before continuing.

Returning to decision block 734, if the response from the DSS 304 indicates that the new operational intent is not approved, then the result of decision block 734 is NO, and the method 700 proceeds to block 744. At block 744, the SCD engine 512 transmits an indication of failure to the UTM computing system 310. As mentioned above and described in the Standard, the failure response from the DSS 304 includes identities of the third-party USSes 316 that had OVNs that had not been considered. The external intent engine 516 may query the indicated third-party USSes 316 in order to retrieve existing operational intents that had not been considered, and the external intent engine 516 may process and store the unconsidered existing operational intents in the geographic information data store 312 as discussed above. In some embodiments, the indication of failure transmitted to the UTM computing system 310 may be held until the results are received from the third-party USSes 316. In this way, it can be ensured that the new operational intent will not be re-submitted prior to receiving the updates.

At block 746, the SCD rule receives the indication of failure and returns a failure rule result, which indicates to the rule engine 410 that conflicts were found during strategic conflict detection. The method 700 then proceeds to a continuation terminal ("terminal B").

From terminal B (FIG. 7D), the method 700 proceeds to block 748, where the rule engine 410 receives rule results from each rule of the plurality of rules, including both the SCD rule and the other rules 414.

The method 700 then proceeds to a decision block 750, where a determination is made based on whether the rule results indicate pass or failure. If all of the rule results indicate pass results, then the result of decision block 750 is YES, and the method 700 proceeds to block 752. At block 752, the rule engine 410 transmits a pass result to the operational intent creator 318. At block 754, the operational intent creator 318 takes action in accordance with the new operational intent. If the operational intent creator 318 was a flight planning computing system 306, then the USS system 302 may take actions to implement the operational intent. For example, the USS system 302 may transmit commands to one or more devices, including but not limited to a UAV, to perform the flight described in the new operational intent. If the operational intent creator 318 was a test generation computing system 308, then the test generation computing system 308 may compare the pass result to an expected result for the new operational intent, and may record that the test passed or failed accordingly. The method 700 then proceeds to an end block and terminates.

Returning to decision block 750, if at least one rule result indicates failure, then the result of decision block 750 is NO, and the method 700 proceeds to block 756. At block 756, the rule engine 410 transmits a disapproval result to the operational intent creator 318. At block 758, the operational intent creator 318 takes action to address the failure associated with the new operational intent. If the operational intent creator 318 was a test generation computing system 308, then the test generation computing system 308 could compare the failure result to an expected result for the new operational intent, and may record that the test passed or failed accordingly. If the operational intent creator 318 was a flight planning computing system 306, then the flight planning computing system 306 could re-plan the new operational intent to avoid the newly retrieved existing operational intents, and may then re-submit the updated new operational intent. One additional advantage provided by the geographic information data store 312 is that, since it is provided as a component of the USS system 302 that may be shared by other components, the flight planning computing system 306 may retrieve the existing operational intents from the geographic information data store 312 in order to determine how to update the new operational intent to avoid them.

The method 700 then proceeds to an end block and terminates.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a first unmanned aerial vehicle (UAV) service supplier (USS) system, causes the first USS system to efficiently coordinate UAV operations, wherein the first USS system operates UAVs in a geographic area where one or more third-party USSes also operate UAVs, by performing actions comprising:

receiving, by an interoperability computing system of the first USS system, a new operational intent from a rule engine of a UAV traffic management (UTM) computing system of the first USS system;

retrieving, by the interoperability computing system, a set of relevant operational intents that are relevant to the new operational intent from a geographic information data store;

comparing, by the interoperability computing system, the new operational intent to each relevant operational intent of the set of relevant operational intents to detect conflicts;

in response to detecting no conflicts, transmitting, by the interoperability computing system, an approval request to a discovery and synchronization service (DSS); and in response to receiving, by the interoperability computing system, an approval message from the DSS:

causing, by the interoperability computing system, the first USS system to transmit commands to one or more devices to perform a flight described in the new operational intent;

wherein retrieving the set of relevant operational intents that are relevant to the new operational intent from the geographic information data store includes:

determining a geographic index value associated with the new operational intent; and retrieving data from the geographic information data store using the geographic index value.

2. The non-transitory computer-readable medium of claim 1, wherein the actions further comprise, in response to detecting a conflict, transmitting, by the interoperability computing system, a failure response to the rule engine.

3. The non-transitory computer-readable medium of claim 1, wherein the actions further comprise:

in response to receiving the approval message from the DSS:

storing, by the interoperability computing system, the new operational intent in the geographic information data store; and transmitting, by the interoperability computing system, the new operational intent to the one or more third-party USSes.

4. The non-transitory computer-readable medium of claim 3, wherein the new operational intent includes a detailed geographic information; and wherein storing the new operational intent in the geographic information data store includes:

determining a bounding volume that includes the detailed geographic information; and storing the bounding volume in the geographic information data store.

5. The non-transitory computer-readable medium of claim 4, wherein transmitting the new operational intent to the one or more third-party USSes includes:

transmitting the detailed geographic information to the one or more third-party USSes.

6. The non-transitory computer-readable medium of claim 1, wherein the actions further comprise:

in response to receiving a disapproval message from the DSS:

retrieving, by the interoperability computing system, additional operational intents from the one or more third-party USSes;

storing, by the interoperability computing system, the additional operational intents in the geographic information data store; and repeating, by the interoperability computing system, the retrieving and comparing actions.

7. The non-transitory computer-readable medium of claim 1, wherein the actions further comprise:

receiving, by the interoperability computing system, an external operational intent from a third-party USS of the one or more third-party USSes, wherein the external operational intent includes a detailed geographic information;

determining, by the interoperability computing system, a bounding volume for the detailed geographic information;

determining, by the interoperability computing system, a geographic index value for the external operational intent based on the detailed geographic information; and storing, by the interoperability computing system, the external operational intent in the geographic information data store in association with the bounding volume and the geographic index value.

8. The non-transitory computer-readable medium of claim 1, wherein the actions further comprise:

receiving, by the rule engine, a proposed operational intent that includes a detailed geographic information; and executing, by the rule engine, a plurality of rules to determine whether the proposed operational intent is approved;

wherein executing the plurality of rules includes:

determining, by the rule engine, whether strategic conflict detection logic of a strategic conflict detection rule should be executed based on the detailed geographic information, wherein the strategic conflict detection logic causes the proposed operational intent to be transmitted to the interoperability computing system for processing; and executing, by the rule engine, the strategic conflict detection rule;

wherein executing the strategic conflict detection rule includes:

in response to determining that the strategic conflict detection logic should be executed:

transmitting, by the rule engine, the proposed operational intent to the interoperability computing system for processing; and returning, by the rule engine, a rule result for the strategic conflict detection rule based on the processing of the interoperability computing system; and in response to determining that the strategic conflict detection logic should not be executed:

transmitting, by the rule engine, a success rule result for the strategic conflict detection rule.

9. The non-transitory computer-readable medium of claim 8, wherein receiving the proposed operational intent includes receiving the proposed operational intent from a flight planning computing system or a test generation computing system.

10. The non-transitory computer-readable medium of claim 1, wherein the new operational intent includes detailed geographic information having a start time, an end time, a start location, an end location, and a plurality of segments;

wherein comparing the new operational intent to each relevant operational intent of the set of relevant operational intents to detect conflicts includes:

determining simplified geographic information for the new operational intent that includes a four-dimensional bounding volume that covers an entirety of the start location, the end location, and the plurality of segments between the start time and the end time; and comparing the simplified geographic information for the new operational intent to simplified geographic information retrieved from the geographic information data store for each relevant operational intent.

11. A system for efficient coordination of unmanned aerial vehicle (UAV) operations by a first UAV service supplier (USS) system, wherein the first USS system operates UAVs in a geographic area where one or more third-party USSes also operate UAVs, the system comprising:

an interoperability computing system having one or more processors and a non-transitory computer-readable medium having logic stored thereon that, in response to execution by the one or more processors, causes the interoperability computing system to perform actions comprising:

receiving, by the interoperability computing system, a new operational intent from a rule engine of the first USS system;

retrieving, by the interoperability computing system, a set of relevant operational intents that are relevant to the new operational intent from a geographic information data store of the first USS system;

comparing, by the interoperability computing system, the new operational intent to each relevant operational intent of the set of relevant operational intents to detect conflicts;

in response to detecting no conflicts, transmitting, by the interoperability computing system, an approval request to a discovery and synchronization service (DSS); and in response to receiving, by the interoperability computing system, an approval message from the DSS:

causing, by the interoperability computing system, the first USS system to transmit commands to one or more devices to perform a flight described in the new operational intent;

wherein retrieving the set of relevant operational intents that are relevant to the new operational intent from the geographic information data store includes:

determining a geographic index value associated with the new operational intent; and retrieving data from the geographic information data store using the geographic index value.

12. The system for efficient coordination of claim 11, wherein the actions further comprise, in response to detecting a conflict, transmitting, by the interoperability computing system, a failure response to the rule engine.

13. The system for efficient coordination of claim 11, wherein the actions further comprise:

in response to receiving the approval message from the DSS:

storing, by the interoperability computing system, the new operational intent in the geographic information data store; and transmitting, by the interoperability computing system, the new operational intent to the one or more third-party USSes.

14. The system for efficient coordination of claim 13, wherein the new operational intent includes a detailed geographic information; and wherein storing the new operational intent in the geographic information data store includes:

determining a bounding volume that includes the detailed geographic information; and storing the bounding volume in the geographic information data store.

15. The system for efficient coordination of claim 14, wherein transmitting the new operational intent to the one or more third-party USSes includes:

transmitting the detailed geographic information to the one or more third-party USSes.

16. The system for efficient coordination of claim 11, wherein the actions further comprise:

in response to receiving a disapproval message from the DSS:

retrieving, by the interoperability computing system, additional operational intents from the one or more third-party USSes;

storing, by the interoperability computing system, the additional operational intents in the geographic information data store; and repeating, by the interoperability computing system, the retrieving and comparing actions.

17. The system for efficient coordination of claim 11, wherein the actions further comprise:

receiving, by the interoperability computing system, an external operational intent from a third-party USS of the one or more third-party USSes, wherein the external operational intent includes a detailed geographic information;

determining, by the interoperability computing system, a bounding volume for the detailed geographic information;

determining, by the interoperability computing system, a geographic index value for the external operational intent based on the detailed geographic information; and storing, by the interoperability computing system, the external operational intent in the geographic information data store in association with the bounding volume and the geographic index value.

18. The system for efficient coordination of claim 11, further comprising a UAV traffic management (UTM) computing system having one or more processors and a non-transitory computer-readable medium having logic stored thereon that, in response to execution by the one or more processors of the UTM computing system, cause the UTM computing system to provide a rule engine configured to:

receive, by the rule engine, a proposed operational intent that includes a detailed geographic information; and execute, by the rule engine, a plurality of rules to determine whether the proposed operational intent is approved;

wherein executing the plurality of rules includes:

determining, by the rule engine, whether strategic conflict detection logic of a strategic conflict detection rule should be executed based on the detailed geographic information, wherein the strategic conflict detection logic causes the proposed operational intent to be transmitted to the interoperability computing system for processing; and executing, by the rule engine, the strategic conflict detection rule;

wherein executing the strategic conflict detection rule includes:

in response to determining that the strategic conflict detection logic should be executed:

transmitting, by the rule engine, the proposed operational intent to the interoperability computing system for processing; and returning, by the rule engine, a rule result for the strategic conflict detection rule based on the processing of the interoperability computing system; and in response to determining that the strategic conflict detection logic should not be executed:

transmitting, by the rule engine, a success rule result for the strategic conflict detection rule.

19. The system for efficient coordination of claim 18, wherein receiving the proposed operational intent includes receiving the proposed operational intent from a flight planning computing system or a test generation computing system.

* * * * *